Oct. 13, 1970  O. T. BENDICSEN  3,533,613

AXIALLY RETRACTABLE LANDING GEAR

Filed Nov. 2, 1967

*INVENTOR.*
OLAF T. BENDICSEN
BY
George C Sullivan
Agent

United States Patent Office 3,533,613
Patented Oct. 13, 1970

3,533,613
AXIALLY RETRACTABLE LANDING GEAR
Olaf T. Bendicsen, La Crescenta, Calif., assignor to
Lockheed Aircraft Corporation, Burbank, Calif.
Filed Nov. 2, 1967, Ser. No. 680,070
Int. Cl. B60q 11/26
U.S. Cl. 267—64
12 Claims

ABSTRACT OF THE DISCLOSURE

A combination shock strut and axially retractable landing gear for aircraft, having telescoping members which cooperate to define pressure chambers capable of applying a reaction force against the aircraft load during take-off and landing procedures. Hydraulic means are also provided to axially compress the members for retracting the landing gear.

BACKGROUND OF THE INVENTION AND DESCRIPTION OF THE PRIOR ART

This invention relates generally to a combination shock strut and landing gear for an aircraft and more particularly to means for improving both the landing and take-off characteristics of the shock strut and to the combining of such means with the retraction system. Additional to the main function of facilitating aircraft take-off and landing procedures, landing gear assemblies have two primary requirments: (1) to asborb shock and isolate it from the vehicle structure; and (2) to retract during non-use periods for enhancement of aerodynamic characteristics. In functioning as a shock strut the assembly must provide a reaction force to counterbalance the aircraft loads acting on the gear during take-off and landing and also to absorb the shock loads encountered during taxi procedures. Although not mandatory in all cases, it is usually desirable, as mentioned, that landing gears be able to retract into the aircraft structure, thereby reducing aerodynamic drag on the aircraft during flight.

Heretofore, commonly used landing gears have included separate linkages and components to incorporate the dual features mentioned above. Each strut in such landing gears has included a shock absorber pivotally mounted for retraction to a horizontal position in a suitably provided space in the aircraft fuselage or wing. Struts of this nature, although used extensively, suffer from a basic disadvantage, i.e., the direction of the shock stroke movement is different from that of the retraction stroke, thereby requiring separate components to accomplish these different stroke movements.

Such shock struts also require a compromise between the break-away force, i.e. that force required to initiate retraction of the strut from its fully extended position, for soft landings and for good riding characteristics during taxi and take-off with a full load of fuel in the aircraft. The problems of such a compromise are especially acute in aircraft having a high take-off to landing weight ratio. An aircraft having high pressure landing struts has good take-off characteristics because of the high reaction force which absorbs the high aircraft loads. However, because of the high pressure which must be overcome, the break-away forces are high, which results in hard landings. Conversely, an aircraft having low pressure landing struts has good landing qualities because of the low break-away force requirements but poor taxiing characteristics during take-off.

The shock strut most commonly used incorporates a single air-oil chamber having a single gas pressure. As a consequence, if the air chamber is under a gas pressure which is sufficiently high to withstand aircraft loads during take-off, the air chamber is too hard to afford a soft landing, since the break-away force is very high. If the air chamber is under a low gas pressure, the shock strut is very rigid during take-off and affords poor taxiing characteristics.

Therefore, there is a definite need for a landing gear which provides a shock strut suitable under all operational conditions.

SUMMARY OF THE INVENTION

A combined axially retractable landing gear and shock strut for aircraft comprising a first and second hollow cylinder cooperating to define a cavity therein, with means within one of the cylinders to separate the cavity into first and second pressure chambers, which are adapted to apply a reactionary force against static and dynamic loads of the aircraft. Means are also provided to retract the second hollow cylinder within the first hollow cylinder.

An object of this invention is to provide shock strut means which adequately protect the aircraft against excessive shock under all conditions of taxiing, take-off and landing.

Another object of the invention is to provide soft landings of the aircraft by reducing the breakaway force of the landing gear.

Another object of the invention is to improve the aircraft ride when taxiing over bumps or holes in the runaway.

Another object of this invention is to provide a shock strut that has a long shocking stroke and at the same time has a low fully extended pressure.

Another object of the invention is to provide means which are capable of locking the landing gear in an infinite number of axial positions.

Various other objects and advantages will appear from the following description of an embodiment of the invention.

DESCRIPTION OF THE INVENTION

Figure 1:
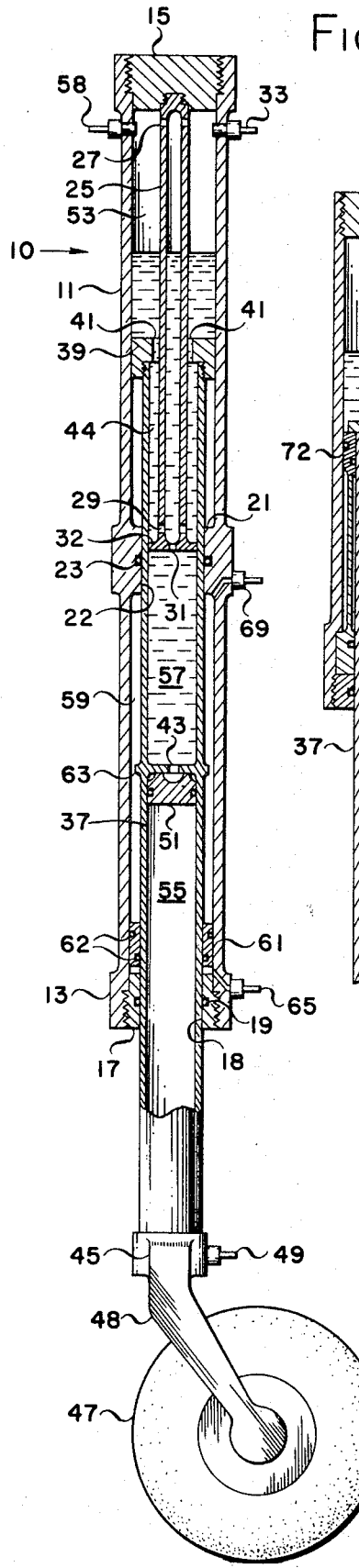
FIG. 1 is a sectional view of a retractable landing gear embodying the invention.

In the embodiment of the invention illustrated in FIG. 1, a landing gear 10 includes an outer cylinder 11 having a lower open end 13 and an upper closed end 15 threadedly mounted thereon. A lower bearing support 17 is threadedly engaged to lower open end 13 and has an internal bearing surface 18. An O ring 19 is provided in the bearing surface 18 for sealing purposes.

Threadedly connected in fixed relation to outer cylinder 11 at its upper closed end 15 is an inner cylinder 25 which includes upper and lower ports 27 and 29, respectively. A metering orifice 31 is formed at the lower end of inner cylinder 25 with an annular bearing flange 32 extending outwardly therefrom. An air valve or valves 33, 58 is located at upper closed end 15 of outer cylinder 11 so as to communicate with the interior of cylinder 11.

A hollow piston 37, which is in actuality both a piston and a cylinder, is movably mounted between outer cylinder 11 and inner cylinder 25 and extends upward through the lower open end 13 of outer cylinder 11. Piston 37 bears against and is respectively supported by an upper bearing support 21 and lower bearing support 17. An O ring 23 is provided in bearing surface 22 of support 21 for sealing purposes. A piston head 39 is threadedly mounted on the upper end of hollow piston 37 and has a cross-sectional area which extends over the entire internal cross-sectional area of outer cylinder 11 and is configured to slidably encompass a segment of the inner cylinder 25. Piston head 39 includes a plurality of bleed grooves 41 which extend therethrough. The interior of hollow piston 37 also includes a secondary orifice 43 located near its midlength. A rebound chamber 44 is thus formed beneath piston head 39 and in piston 37. The lower end of hollow piston 37 includes a flange or hub 45 which is adapted to be connected to a wheel 47 through a fork 48. Hub 45 further includes an air valve 49 thereon which communicates with the interior of piston 37.

Located within the lower portion of hollow piston 37 and axially reciprocable therein is a floating piston 51. The interior of the landing gear is divided into a primary air-oil chamber 53 above floating piston 51 and a secondary air chamber 55 below it. An oil reservoir 57 is located in primary air-oil chamber 53. Primary air-oil chamber 53 includes the respective interior of cylinder 11 above bearing support 21, cylinder 25, and piston 37 above floating piston 51.

A retracting chamber 59 is defined between outer cylinder 11 and hollow piston 37 between upper bearing support 21 and lower bearing support 17. An annular floating piston 61 is positioned within retracting chamber 59, being axially reciprocal therein, and is suitably sealed, as by the illustrated O rings 62, to prevent undue fluid bypass. Floating piston 61 is engageable with a shoulder 63 extending outwardly from hollow piston 37 adjacent its secondary orifice 43. Located at the lower and upper ends of retracting chamber 59 are a pressure port 65 and a return port 69, the ports communicating through valve means (not shown) to the aircraft hydraulic system.

In operation, during the normal shocking stroke, piston 37 reciprocates within cylinder 11, being disposed in such reciprocation outwardly of inner cylinder 25, and supported by upper and lower bearing supports 21 and 17, respectively. Piston 37 initially moves upward, compressing the air in primary air-oil chamber 53 and forcing oil located above piston head 39 in primary chamber 53 to flow through upper ports 27 and thence downwardly through metering orifices 31 and 43, thereby dissipating the primary portion of the impact energy of the shocking stroke. Lower ports 29 of inner cylinder 25 are provided for flow of oil from the interior of cylinder 25 into rebound chamber 44 to keep piston head 39 from rebounding at an excessive rate. The bleed grooves 41 in piston head 39 are also provided to absorb and dampen some of the rebound energy of the shocking stroke. This energy absorption is achieved as piston head 39 forces oil in the rebound chamber 44 back out through the lower ports 29 and through the bleed grooves 41 of the piston head 39 itself, during the rebound stroke.

Primary air-oil chamber 53 is maintained at a lower air pressure than is secondary air chamber 55. Therefore, under a normal shocking stroke floating piston 51 remains abutted against the shoulders of secondary orifice 43 while piston 37 compresses the air in primary air-oil chamber 53. However, if a higher reaction force is necessary, the pressure in primary air-oil chamber 53 forces floating piston 51 to break away from the shoulders of secondary orifice 43 to compress the air in secondary air chamber 55. During take-off when the aircraft is at full weight, the chamber 53 is compressed by piston 39 to extent necessary to balance the load applied to the strut by the aircraft. If the wheel hits a bump in the runway, the pressure chamber 53 is compressed further, with pressure chamber 55 taking up any of the excess load.

During the landing approach the strut is in its fully extended position. Upon touchdown the initial force of the landing results in an immediate break-away of piston 51 since the only initial force opposing this strut is the pressure force in low pressure chamber 53. This low break-away force characteristic assures a soft landing under normal circumstances. However, in the event the aircraft undergoes an excessively hard touchdown, high pressure chamber 55 is additionally available to absorb any load in excess of that which low pressure chamber 53 is capable of handling. As stated above, most of the impact upon landing is dissipated by the controlled flow of oil through metering orifices 31 and 43, with the remaining energy being absorbed by compression of air in pressure chambers 53 and 55. When this remaining energy reacts on piston head 39 to force piston 37 downwardly, the oil drawn into rebound chamber 44 from the shock stroke is expelled through ports 29 and bleed grooves 41 to dampen the rebound stroke. After touchdown and during taxiing, the strut remains responsive to runway bumps even though the weight of the aircraft has been materially decreased due to the loss in fuel. This results from the fact that chamber 53, due to its low pressure, retains its ability to react to a shock load.

Therefore, as can be seen, the total amount of shock encountered by the landing gear during take-off or landing procedure is greatly reduced before being transferred through the landing gear to the aircraft fuselage, and ultimately to the passengers or other payload, thereby materially improving the ride and comfort characteristics of the aircraft.

Figure 3:
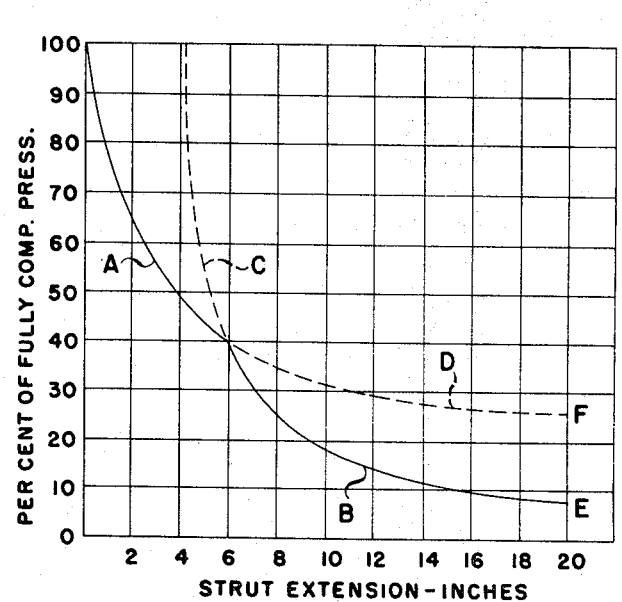
FIG. 3 is a graph of a shock strut pressure curve plotted against strut extension.

The take-off and landing characteristics of the landing gear are illustrated by the graph of FIG. 3 in which the pressure curve of the shock strut is represented by solid lines A and B. The curve is plotted by percent of fully compressed pressure against strut extension in inches. As can be seen by the graph, the total stroke of the embodied strut is shown as 20 inches, for illustrative purposes only. Line A represents that part of the curve where both the high and low pressure air chambers are being compressed. This normally occurs during take-off when the aircraft has a full load of fuel and is, therefore, at its heaviest and at which time the strut is extended only a short distance. Line B represents that part of the curve wherein only primary air-oil chamber 53 is being compressed. This normally occurs during landing, at which time the strut is in its fully extended position. Point E represents the break-away force needed to initiate strut retraction upon landing. It is again noted that this break-away force is relatively small and provides for an unusually soft landing. When the aircraft makes a relatively hard touchdown, both chambers are compressed and the strut retracts to the point on line A where both chambers are compressed, again resulting in a singular significant shock reduction.

The advantages of this invention over the prior art can readily be seen. For example, were a single gas chambered strut placed under the same pressure as chamber 53, its pressure curve would be a hyperbolic curve represented by line B and broken line C. As can be seen, the strut would have good landing qualities with a low break-away point. However, line C, which represents the strut during take-off, is nearly vertical. Therefore, during take-off, a strut so constructed would be very rigid and non-responsive to changes in chamber pressure and its poor take-off and taxiing characteristics would be undesirable for either passenger or cargo service.

In contradistinction, if a single gas chamber strut were under a very high pressure, for example, the combined pressures of chambers 53 and 55, its pressure curve would be a hyberbolic curve represented by line A and broken line D. Here the strut would have good take-off qualities; however, its landing characteristics, as represented by line D, would be poor. First of all, the break-away force as represented by point F would be relatively high, resulting in causing hard landing characteristics; this despite the fact that aircraft alighted softly. Secondly, upon landing the taxiing characteristics would be undesirably rough because of the flatness of curve D.

Therefore, it can be seen that the landing gear of this invention utilizes the best parts of both curves to provide good strut characteristics throughout take-off, landing and taxiing operations.

In the retracting sequence, assuming that piston 37 is in its fully extended position, pressurized fluid from the aircraft hydraulic system is admitted through pressure port 65, forcing floating piston 61 upward into engagement with shoulder means 63 of piston 37. Thereafter, additional application of pressurized fluid moves floating piston 61 and piston 37 in unison until piston 37 is in its fully retracted position. During such movement, fluid or air above floating piston 61 is expelled from cylinder 11 via return port 69.

To extend the landing gear, the procedure is reversed, i.e., pressurized fluid is introduced through return port 69 from the aircraft hydraulic system to force piston 61 downwardly in retracting chamber 59 while fluid pressure below floating piston 61 is expelled through pressure port 65 returning to the hydraulic system. Piston 37 follows travel of the floating piston 61 since it is under pressure from primary air-oil chamber 53. It should be noted that since floating piston 61 is slidable with respect to piston 37, the area of compression during the shocking stroke is only that area in pressure chamber 53, piston 37 not being required to compress the fluid in retraction chamber 59.

Another feature of the invention is that piston 37 can be locked in infinite number of axial positions between full extension and full retraction by the valving of ports 65 and 69. This feature is advantageous during the cargo loading of the aircraft when it is necessary to lower the fuselage of the aircraft in a squatting position for ease of loading.

Figure 2:
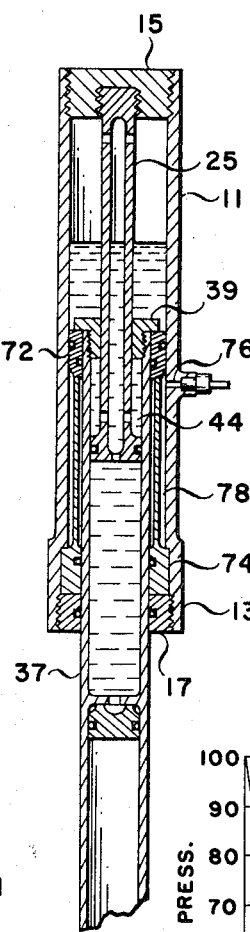
FIG. 2 is a sectional view of a second embodiment of a retractable landing gear embodying the invention.

FIG. 2 shows a modification of the invention wherein the upper bearing support 21 is eliminated. In this embodiment the upper portion of piston 37 bears directly against a retracting piston 72 which is reciprocable along the inner surface of cylinder 11. A spacer sleeve 74 is included between piston 37 and outer cylinder 11 to keep retracting piston 72 and lower bearing support 17 in a spaced relationship. A single port 76 is located at the upper end of a retracting chamber 78. As fluid is introduced through port 76, piston 72 is urged upwardly, carrying piston head 37 and its piston or landing strut 37 upwardly, thereby retracting the landing gear. The remaining elements of the modification in FIG. 2 are identical to those in FIG. 1. As can be seen, the distance between the two supporting members varies from a maximum when piston cylinder 37 is in its fully retracted position, to a minimum when it is in its fully extended position and retracting piston 72 is in engagement with spacer sleeve 74. The main advantage of this modification is that the minimum length between the supporting members is less than is possible between the two bearing supports 21 and 17 of FIG. 1, which are fixed. With such a decrease in length, a shorter landing gear is afforded. However, the operation of the landing gear in FIG. 2 is the same as that of the FIG. 1 configuration.

As can be seen, the device, according to the invention, achieves a cooperative action between the hydraulic mechanism which facilitates the movements of both the shock stroke and the retraction stroke, thereby providing a great enhancement in shock characteristics during take-off, landing and taxiing operations.

It will be understood that various changes in the details, materials, steps and arrangements of parts which have been herein described and illustrated to explain the nature of the invention may be made.

I claim:

1. A combined axially retractable landing gear and shock strut for an aircraft comprising in combination,
    a first cylinder having a closed end;
    a second cylinder reciprocably mounted therein and having an open end axially extending toward the closed end of said first cylinder, the latter having a fixed piston head thereon for defining a variable volumed cavity withing said first cylinder, said piston head having a cross-sectional area extending over the internal cross-sectional area of said first cylinder;
    spaced bearing surface means between said first and second cylinders and disposed below said piston head for supporting said cylinders in spaced relationship to each other;
    a third cylinder connected to the closed end of said first cylinder and extending into and being spaced from said second cylinder;
    annular bearing flange means mounted on said third cylinder engaging said second cylinder;
    a rebound chamber formed by said second and third cylinders, piston head and annular bearing flange;
    the interior of said third cylinder communicating with said first cylinder and with said rebound chamber;
    means below said annular flange means for separating said second cylinder into first and second pressure cavities; and
    means for retracting said second cylinder into said first cylinder.

2. The combination of claim 1 in which a plurality of upper ports and lower ports in said third cylinder provides for the communication between the first and third cylinders and the third cylinder and rebound chamber, respectively, whereby oil disposed in said combination and drawn into the rebound chamber by operation of such combination is expelled from the rebound chamber back through the lower ports by actuation of said piston head.

3. The combination of claim 2 in which said separating means includes a floating piston below a secondary orifice through which such oil flows.

4. The combination of claim 2 in which said annular bearing flange means includes an orifice providing for a restriction through which such oil flows into the first of said pressure cavities.

5. The combination of claim 4 in said separating means includes a floating piston below a secondary orifice through which such oil flows.

6. The combination of claim 5 in which said piston head includes bleed grooves extending therethrough to provide further communication between said rebound chamber and said first chamber.

7. The combination of claim 1 in which said piston head includes bleed grooves extending therethrough to provide further communication between said rebound chamber and said first chamber.

8. In a combined axially retractable landing gear and shock strut for an aircraft and including first and second hollow cylinders, said second cylinder including a piston head and being axially reciprocable within the former, improvement comprising the combination of,
    upper and lower bearing surfaces for spacing apart said first and second cylinders and thereby forming an annular chamber between said surfaces and cylinders,
    a floating member disposed in said annular chamber,
    means mounted on said second cylinder for axially displacing said second cylinder relative to said first cylinder, and
    valve means mounted on said first cylinder communicating with said annular chamber for introduction of fluid in said annular chamber to move said floating member into engagement with said displacing means, thereby causing such relative movement between said cylinders.

9. The improvement of claim 8 in which said floating member is disposed in said annular chamber between said displacing means and the lower of said bearing surfaces.

10. The improvement of claim 9 in which said displacing means comprises a shoulder mounted about said second cylinder.

11. The improvement of claim 9 in which said valve means comprises, a pair of valves, one mounted on said first cylinder above the retracted position of said displacing means, the other being mounted on said first cylinder below said floating piston in its closest proximity with the lower of said bearing surfaces.

12. The improvement of claim 9 in which said displacing means comprises said piston head and said valve means comprises a valve mounted on said first cylinder below the position of said floating piston when said second cylinder is in its most extended axial position relative to said first cylinder, said floating piston being disposed between said piston head and valve for every relative position of said second cylinder to said first cylinder.

References Cited
UNITED STATES PATENTS 2,856,180 10/1958 Westcott _____ 267—64
3,056,598 10/1962 Conway et al. _____ 267—64

JAMES B. MARBERT, Primary Examiner